United States Patent
Whitman et al.

(10) Patent No.: US 11,562,568 B2
(45) Date of Patent: Jan. 24, 2023

(54) DYNAMICALLY CREATING A COMPOSITION REFERENCE VIDEO TO SUPPORT A USER ACTIVITY

(71) Applicant: KYNDRYL, INC., New York, NY (US)

(72) Inventors: Todd Russell Whitman, Bethany, CT (US); Mauro Marzorati, Lutz, FL (US); Jeremy R. Fox, Georgetown, TX (US); Michael Bender, Rye Brook, NY (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/303,395

(22) Filed: May 27, 2021

(65) Prior Publication Data
US 2022/0383028 A1    Dec. 1, 2022

(51) Int. Cl.
*H04N 7/18*    (2006.01)
*G06V 20/40*    (2022.01)
(Continued)

(52) U.S. Cl.
CPC ............ *G06V 20/47* (2022.01); *G06F 16/735* (2019.01); *G06F 16/738* (2019.01);
(Continued)

(58) Field of Classification Search
USPC ................................................ 386/241, 248
See application file for complete search history.

(56) References Cited

U.S. PATENT DOCUMENTS 6,473,778 B1 * 10/2002 Gibbon ................. G06F 40/103
715/201
10,170,153 B2    1/2019 Ekambaram
(Continued)

OTHER PUBLICATIONS

"A Method to Determine When a User has Completed a Step in a Tutorial Video", An IP.com Prior Art Database Technical Disclosure, Disclosed Anonymously, IP.com No. IPCOM000264907D, IP.com Electronic Publication Date: Feb. 5, 2021, 3 pages.
(Continued)

*Primary Examiner* — Nigar Chowdhury
(74) *Attorney, Agent, or Firm* — John Kennel; Andrew M. Calderon; Calderon Safran & Cole P.C.

(57) ABSTRACT

A computer-implemented method, a computer program product, and a computer system for dynamically creating a composition reference video to support a user activity. In response to that a user selects a reference video for performing an activity, the computer system identifies a search query of a reference video. The computer system identifies personalized parameters of the user, based on a knowledge corpus user preferences of performing activities, and the search query. The computer system identifies appropriate videos and video transcripts in an online video repository and identifies textual contents through document and text search, based on a prediction about how the user is to perform the activity. The computer system draws series of images based on the textual contents. The computer system normalizes contents from the appropriate videos and the series of images and normalizes voices in the contents from the appropriate videos.

18 Claims, 6 Drawing Sheets

(51) Int. Cl.
  *G06N 5/02* (2006.01)
  *G06F 16/74* (2019.01)
  *G06F 16/783* (2019.01)
  *G06F 16/738* (2019.01)
  *G06F 16/735* (2019.01)

(52) U.S. Cl.
  CPC ........ *G06F 16/743* (2019.01); *G06F 16/7844* (2019.01); *G06N 5/02* (2013.01)

(56) References Cited

U.S. PATENT DOCUMENTS

| | | |
|---|---|---|
| 10,296,640 B1 | 5/2019 | Liao |
| 10,922,105 B1 | 2/2021 | Verma |
| 11,308,273 B2* | 4/2022 | Bender ............ G10L 25/51 |
| 2002/0072040 A1* | 6/2002 | Bajer ............ G09B 7/02 434/236 |
| 2003/0086409 A1* | 5/2003 | Karas ............ H04N 21/84 725/135 |
| 2015/0055936 A1 | 2/2015 | Emery |
| 2022/0084273 A1* | 3/2022 | Pan ............ G06V 40/10 |
| 2022/0115029 A1* | 4/2022 | Garg ............ G10L 17/02 |

OTHER PUBLICATIONS

"AI Art Generators: How to Make AI Art (2020 Guide)", AIArtists.org, © 2019, 7 pages, <https://aiartists.org/ai-generated-art-tools>.

"Personalized Video as a Service", Idomoo, last printed May 27, 2021, 6 pages, <https://pages.idomoo.com/idomoo-personalized-and-dynamic-video-platform>.

"The Cloud Video Editing API", Shotstack, last printed May 27, 2021, 8 pages, <https://shotstack.io/>.

Mell, et al., "The NIST Definition of Cloud Computing", National Institute of Standards and Technology, Special Publication 800-145, Sep. 2011, 7 pages.

Ramelan, Zach, "Make Dynamic Montages with This Easy Video Editing Technique", Premium Beat Blog, Oct. 23, 2017, 9 pages, <https://www.premiumbeat.com/blog/create-dynamic-video-editing-montages/>.

* cited by examiner

… (US 11,562,568 B2)

DYNAMICALLY CREATING A COMPOSITION REFERENCE VIDEO TO SUPPORT A USER ACTIVITY

BACKGROUND

The present invention relates generally to dynamically creating a composition reference video, and more particularly to dynamically creating a composition reference video to support a user activity.

In many situations, users play videos to follow activities and instructional steps presented in the videos. For instance, if a user need to perform an activity (e.g., cooking) the user is not sure how to perform the activity, then the user may search online videos and follow an online instructional video to perform the activity. As one may see in live television shows, instructional videos of activities (such as cooking demonstration) with step by step in procedures of the activities.

In many cases, a user can not follow an available video blindly. Some changes may be necessary, because an actual specific activity to be performed is different from an activity performed in an available video. In an example of a cooking activity, a user may prefer well done or slightly over cooked meals; however, such a user preferred activity is not present in an available video. In a further example of a cooking activity, a user may like additional spicy ingredients, but an available video does not mentioned or present using such spices in an exact manner. In these cases, blindly following an available video and performing an activity may not be very useful in many ways.

SUMMARY

In one aspect, a computer-implemented method for dynamically creating a composition reference video to support a user activity is provided. The computer-implemented method includes, in response to that a user selects a reference video for performing an activity, identifying a search query of the reference video. The computer-implemented method further includes identifying personalized parameters of the user, based on a knowledge corpus about the user, user preferences of performing activities, and the search query. The computer-implemented method further includes predicting how the user is to perform the activity, based on the personalized parameters. The computer-implemented method further includes identifying appropriate videos and video transcripts in an online video repository, based on a prediction about how the user is to perform the activity. The computer-implemented method further includes identifying textual contents through document and text search, based on the prediction. The computer-implemented method further includes drawing series of images based on the textual contents. The computer-implemented method further includes normalizing contents from the appropriate videos and the series of images. The computer-implemented method further includes normalizing voices in the contents from the appropriate videos. The computer-implemented method further includes dynamically creating the composition reference video including normalized video contents and normalized voices.

In another aspect, a computer program product for dynamically creating a composition reference video to support a user activity is provided. The computer program product comprises a computer readable storage medium having program instructions embodied therewith, and the program instructions are executable by one or more processors. The program instructions are executable to: in response to that a user selects a reference video for performing an activity, identify a search query of the reference video; identify personalized parameters of the user, based on a knowledge corpus about the user, user preferences of performing activities, and the search query; predict how the user is to perform the activity, based on the personalized parameters; identify appropriate videos and video transcripts in an online video repository, based on a prediction about how the user is to perform the activity; identify textual contents through document and text search, based on the prediction; draw series of images based on the textual contents; normalize contents from the appropriate videos and the series of images; normalize voices in the contents from the appropriate videos; and dynamically create the composition reference video including normalized video contents and normalized voices.

In yet another aspect, a computer system for dynamically creating a composition reference video to support a user activity is provided. The computer system comprises one or more processors, one or more computer readable tangible storage devices, and program instructions stored on at least one of the one or more computer readable tangible storage devices for execution by at least one of the one or more processors. The program instructions are executable to, in response to that a user selects a reference video for performing an activity, identify a search query of selecting the reference video. The program instructions are further executable to identify personalized parameters of the user, based on a knowledge corpus about the user, user preferences of performing activities, and the search query. The program instructions are further executable to predict how the user is to perform the activity, based on the personalized parameters. The program instructions are further executable to identify appropriate videos and video transcripts in an online video repository, based on a prediction about how the user is to perform the activity. The program instructions are further executable to identify textual contents through document and text search, based on the prediction. The program instructions are further executable to draw series of images based on the textual contents. The program instructions are further executable to normalize contents from the appropriate videos and the series of images. The program instructions are further executable to normalize voices in the contents from the appropriate videos. The program instructions are further executable to dynamically create the composition reference video including normalized video contents and normalized voices.

DETAILED DESCRIPTION

Figure 1:
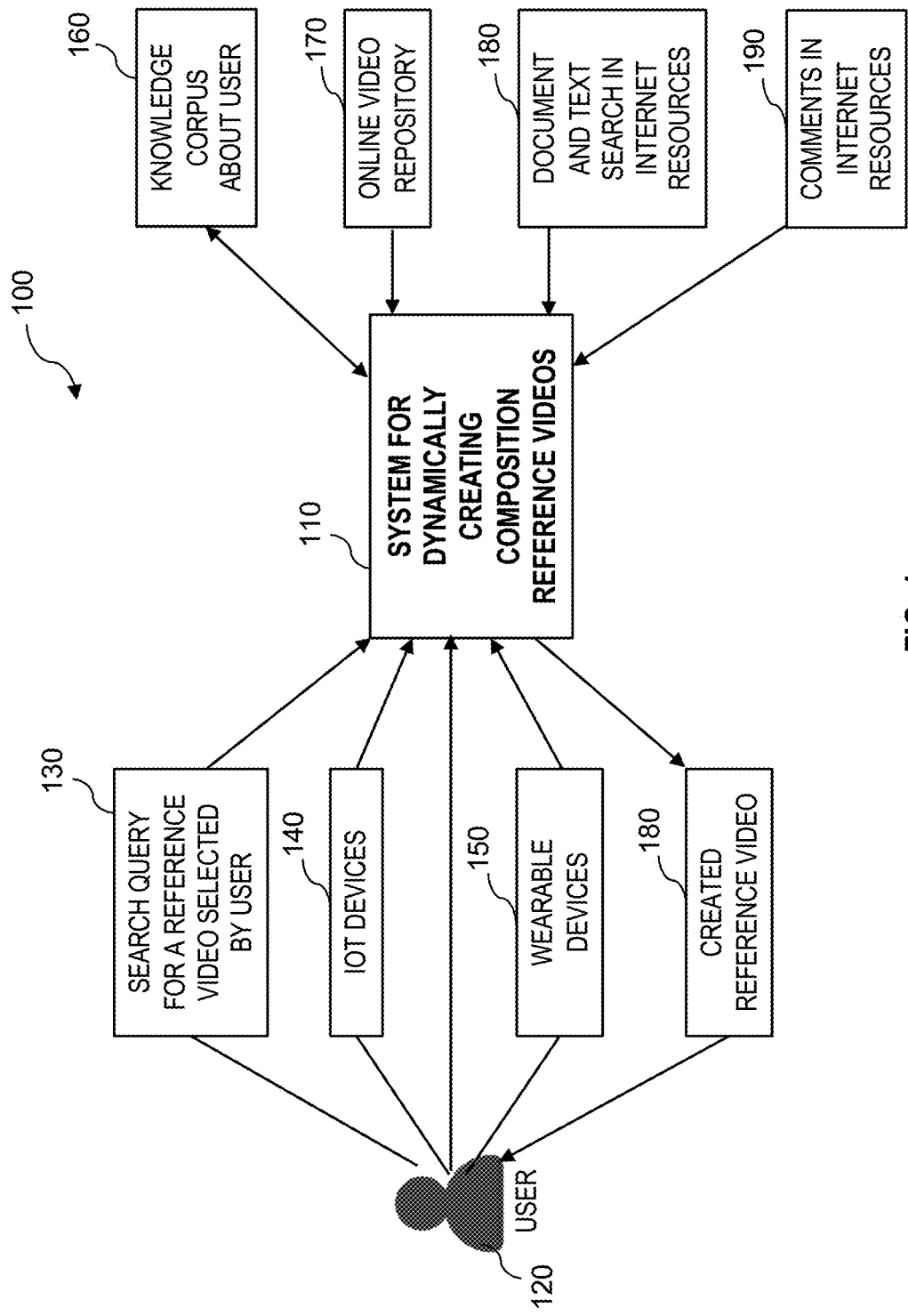
FIG. 1 is a systematic diagram illustrating a system for dynamically creating a composition reference video to support a user activity, in accordance with one embodiment of the present invention.

Embodiments of the present invention disclose a method and system for dynamically creating a composition reference video to support a user activity. In embodiments of the present invention, in response to determining that a user selects a reference video to perform an activity, based on historically identified preferences, prior user's behavior, distribution of activities among multiple users, predicted customization of the activity, and etc., the disclosed system dynamically creates video contents from various sources so that the user can follow a created reference video to perform the activity. The composition reference video is dynamically created from various sources (such as an online video repository). When the various sources are used and processed for creating the composition reference video, copyright law and any law of protecting the various sources are observed. It should be appreciated that any person or organization that uses the present invention should respect intellectual property rights of all content used in the method and system disclosed in the present invention.

By the disclosed method and system, when a user references a video to perform an activity, a created reference video that are tailored for the user will be dynamically created or assembled from various other sources, so that the user can exactly follow steps from the created reference video without any need to start, pause, or resume interaction.

In dynamically creating a composition reference video, the disclosed method and system uses historical learning about user's preference, personalized choice, predicted customization in the activity, behavior while performing any activity, and etc.

In a case where multiple users perform an activity in a collaborative manner, if any one or more users want to follow a reference video, then the disclosed system that is artificial intelligence (AI) enabled will dynamically split a dynamically created reference video into multiple composition reference videos for respective ones of the multiple users and customize the multiple composition reference videos based on respective collaborative activities of the multiple users.

While performing an activity with a reference video, a user may also submit a voice command related to customization needs, and accordingly the disclosed system dynamically updates a composition reference video in a seamless manner so that the user can perform the activity effectively with the created reference video.

The disclosed system adjusts a playback speed (faster or slower) of a reference video so that it matches the wall-clock time that it will normally take. For situations where some time must be allowed to pass (for example, waiting for marinade in a cooking activity), a video of a descending counter is displayed.

The proposed system tracks Internet of Things (IoT) feeds from various devices where a user is performing an activity and also tracks wearable feeds from a user to identify whether the video content is to be updated dynamically from various sources, so that the user can follow a created reference video to perform the activity.

In embodiments of the present invention, a user may perform voice conversation with a reference video while following the reference video to perform an activity. Based on the voice conversation, the disclosed system dynamically creates a composition reference video for the user; the created reference video will include appropriate video clips and/or moving images with audio transcripts.

In embodiments of the present invention, the disclosed system comprises an AI module that uses a knowledge corpus. The AI module proactively identifies and creates appropriate image frames and video spoken transcripts, and then creates a composition reference video for a user.

FIG. 1 is systematic diagram 100 illustrating system 110 for dynamically creating a composition reference video to support a user activity, in accordance with one embodiment of the present invention. System 110 for dynamically creating composition videos may be implemented on one or more computing devices or servers. A computing device or server is described in more detail in later paragraphs with reference to FIG. 3. System 110 may be implemented in a cloud computing environment. The cloud computing environment is described in more detail in later paragraphs with reference to FIG. 4 and FIG. 5.

System 110 for dynamically creating a composition reference video gathers information of behaviors and personal choices of user 120 during performing different activities. For example, for a cooking activity, personal choices may be that user 120 likes spicy, overcooked, or gravy food, etc. System 110 tracks user 120 and determines whether user 120 performs any activity with one or more devices and how user 120 performs the activities. System 110 also gathers feeds from IoT devices 140 where user 120 performing the activities. System 110 also gathers feeds from wearable devices 150; user 120 wears wearable devices 150 while performing the activities. The feeds from IoT devices 140 and from wearable devices 150 are used for identifying how user 120 performs the activities. Based on the information gathered, system 110 creates knowledge corpus 160 about user 120. Knowledge corpus 160 is used by system 110 for dynamically creating the composition reference video. The consent of the user is required in gathering the above-mentioned data or information. In acquiring, processing, storing, transferring, and using the data by the computing device or server, laws are observed and privacy of the user is protected.

When user 120 selects a reference video to perform an activity, system 110 identifies what search query 130 that user 120 uses to get the reference video. Based on search query 130 and knowledge corpus 160 which is specific for user 120, system 110 identifies personalized parameters of user 120. System 110 identifies user's skill capabilities, historical experience, associated activity experience, personal preferences, behavior predispositions, historical viewing choices, and available tools. The personal parameters may include levels of user's skills; for example, whether the user is a novice mechanic, weekend mechanic, or master mechanic. Each of the skill levels may have an associated toolset available, for instance, basic tools, an intermediate toolset, or a professional toolset. Based on the personalized parameters, system 110 predicts how user 120 is going to perform the activity and determines what types of personalized parameters are to be included in the composition reference video.

System 110 analyzes video images and video transcripts to identify what types of contents are present in different videos in online video repository 170. Further, system 110 identifies appropriate videos and video transcripts in online video repository 170, for the purpose of dynamically creating the composition reference video that support user 120 to perform the activity. Online video repository 170 has a knowledge corpus about the content of different videos. Online video repository 170 is updated by adding more videos and metadata over time. System 110 also identifies textual contents through document and text search 180 in different resources such as Internet resources. System 110 includes an artificial intelligence (AI) based drawing module to draw series of images based on the textual contents.

Image frames and spoken contents are gathered by system 110 from various videos and/or textual images, so there will be a problem with standardization and normalizing a dynamically created video. For normalizing the dynamically created video, system 100 converts the image frames from different videos and/or the AI based drawings of diagrams to a command actor that is a superimposed guide or assistant to help link disparate video segments into a cohesive normalized experience. System 110 also normalizes voices in the contents from the appropriate videos, by creating a single voice. System 100 normalizes the voice received from the various videos, and system 110 may also translate automated text to speech. Finally, system 100 dynamically creates a composition reference video (created reference video 180) for user 120 to perform the activity. Created reference video 180 includes the normalized video and the normalized voice.

FIG. 1 illustrates an embodiment of only one user. In other embodiments including multiple users, the multiple users perform the activity and the activity includes collaborative activities for respective users, then the system will split the created reference video into multiple composition reference videos, in such a way that respective ones of the multiple users follow the multiple composition reference videos to perform the collaborative activities.

Figure 2A:
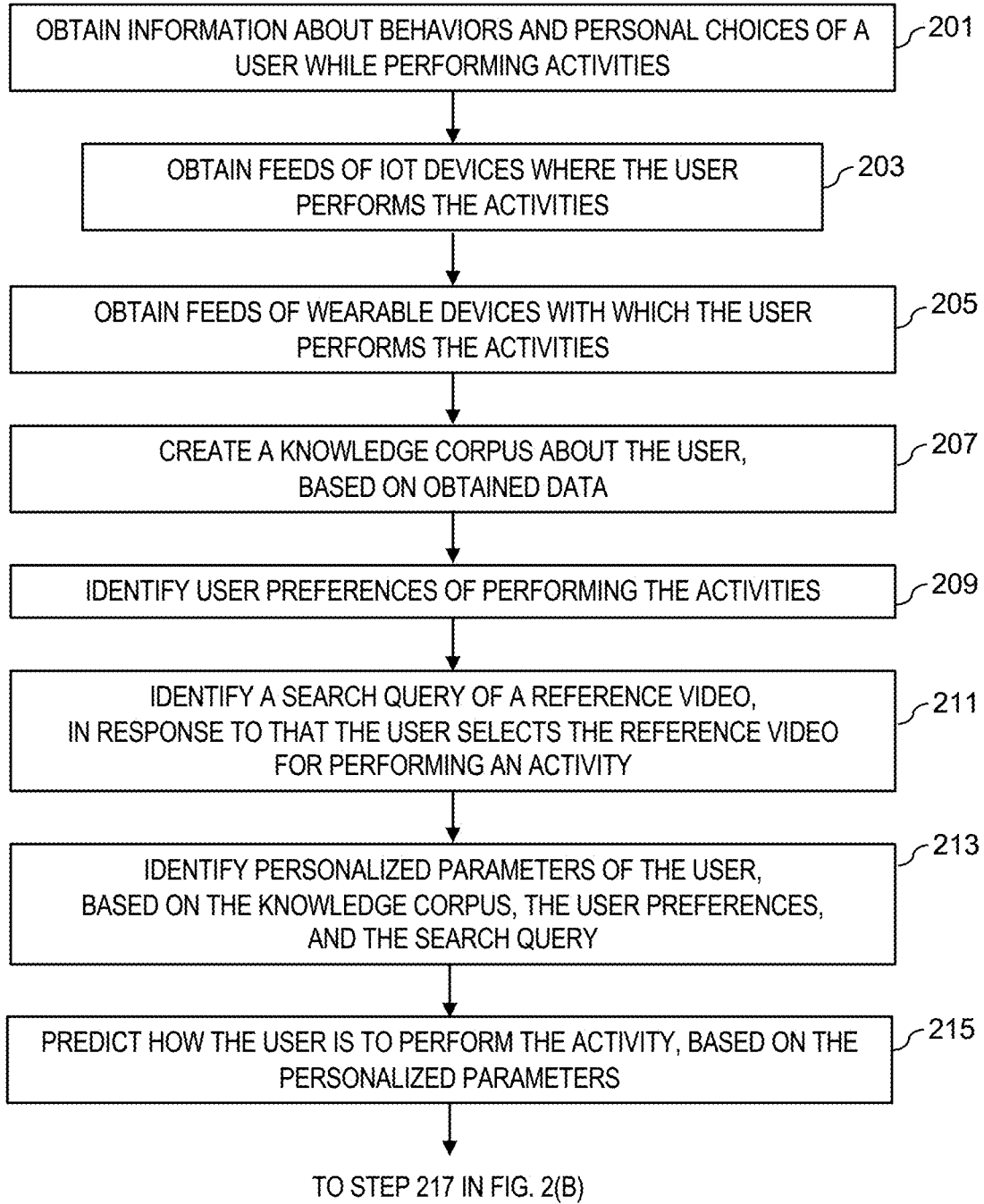
FIG. 2(A) and FIG. 2(B) present a flowchart showing operational steps of dynamically creating a composition reference video to support a user activity, in accordance with one embodiment of the present invention.
Figure 2B:
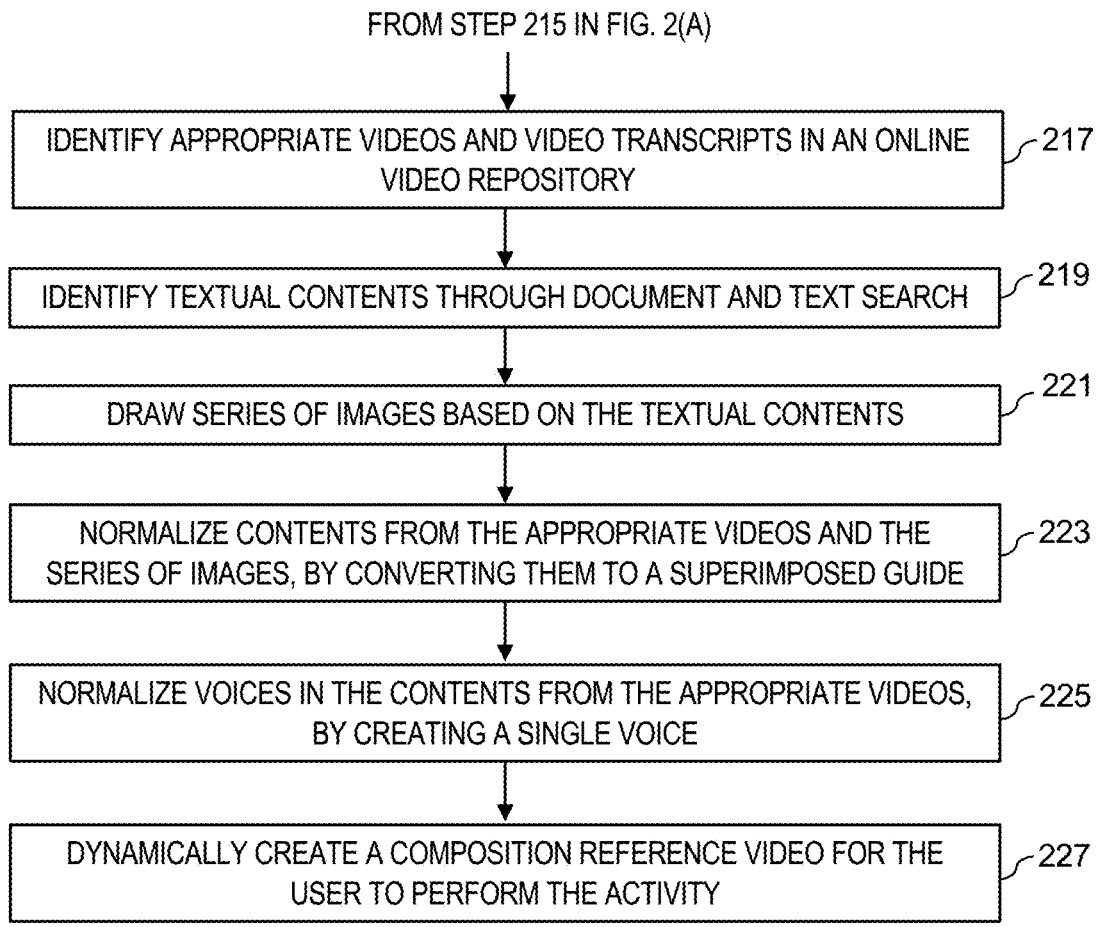

FIG. 2(A) and FIG. 2(B) present a flowchart showing operational steps of dynamically creating a composition reference video to support a user activity, in accordance with one embodiment of the present invention. The operational steps shown in FIG. 2(A) and FIG. 2(B) are implemented by a computing device or a server. A computing device or server is described in more detail in later paragraphs with reference to FIG. 3. In some embodiments, the operational steps may be implemented in a cloud computing environment. The cloud computing environment is described in later paragraphs with reference to FIG. 4 and FIG. 5.

At step 201, the computing device or server obtains information about behaviors and personal choices of a user while performing activities. The computing device or server tracks the user to obtain the information about the user while performing different activities. For example, while the user performs an action of cooking, the computing device or server obtains information of the personal choices of the user, the computing device or server obtains information about whether the user likes spicy, overcooked, or gravy food, etc. At step 203, the computing device or server obtains feeds of IoT (Internet of Things) devices where the user performs the activities. At step 205, the computing device or server obtains feeds of wearable devices with which the user performs the activities. The feeds from IoT devices and from wearable devices are used for identifying how the user performs the activities. At steps 201, 203, and 205, the computing device or server gathers historical data of performing activities by the user. At step 207, the computing device or server creates a knowledge corpus about the user, based on the data obtained at steps 201, 203, and 205. The knowledge corpus is used by the computing device or server for dynamically creating the composition reference video. It should be aware that the consent of the user is required in obtaining and storing the above-mentioned data. It should also be aware that, in acquiring, processing, storing, transferring, and using the data by the computing device or server, laws are observed and privacy of the user is protected. At step 209, the computing device or server identifies user preferences of performing the activities, based on the obtained data in the knowledge corpus.

In response to that the user selects a reference video for performing an activity, at step 211, the computing device or server identifies a search query of the reference video. At step 213, the computing device or server identifies personalized parameters of the user, based on the knowledge corpus, the user preferences, and the search query. The personalized parameters include, for example, user's skill capabilities, historical experience, associated activity experience, personal preferences, behavior predispositions, historical viewing choices, and available tools.

At step 215, the computing device or server predicts how the user is to perform the activity, based on the personalized parameters. At step 217, the computing device or server identifies appropriate videos and video transcripts in an online video repository, based on a prediction about how the user is to perform the activity. Based on the prediction, at step 219, the computing device or server identifies textual contents through document and text search.

At step 221, the computing device or server draws series of images based on the textual contents. The computing device or server has an artificial intelligence (AI) based drawing module to draw the series of images.

At step 223, the computing device or server normalizes contents from the appropriate videos and the series of images, by converting them to a superimposed guide. For normalizing the contents, the computing device or server converts the image frames from different videos and/or the AI based drawings of diagrams to a command actor that is a superimposed guide to help link disparate video segments.

At step 225, the computing device or server normalizes voices in the contents from the appropriate videos, by creating a single voice. The computing device or server normalizes the different voices received from the various videos and/or translates automated text to speech, finally with a single voice.

At step 227, the computing device or server dynamically creates a composition reference video for the user to perform the activity. The composition reference video includes the normalized video and the normalized voice. Therefore, the user can follow the composition reference video to perform the activity.

In another embodiment, the computing device or server tracks the user while the user performing the activity and obtains information of performing the activity. The computing device or server updates the knowledge corpus about the user, based on the information of performing the activity. The consent of the user is required for tracking the user to obtain information. In acquiring, processing, storing, transferring, and using the obtained information by the computing device or server, laws are observed and privacy of the user is protected.

In yet another embodiment, in response to determining that multiple users perform the activity and the activity is distributed (including collaborative activities for respective users), the computing device or server splits the composition reference video into multiple composition reference videos for respective ones of the multiple users, in such a way that the multiple users follow respective ones of the multiple composition reference videos to perform respective collaborative activities in the activity. The computing device or server customizes the multiple composition reference videos based on the respective collaborative activities.

Figure 3:
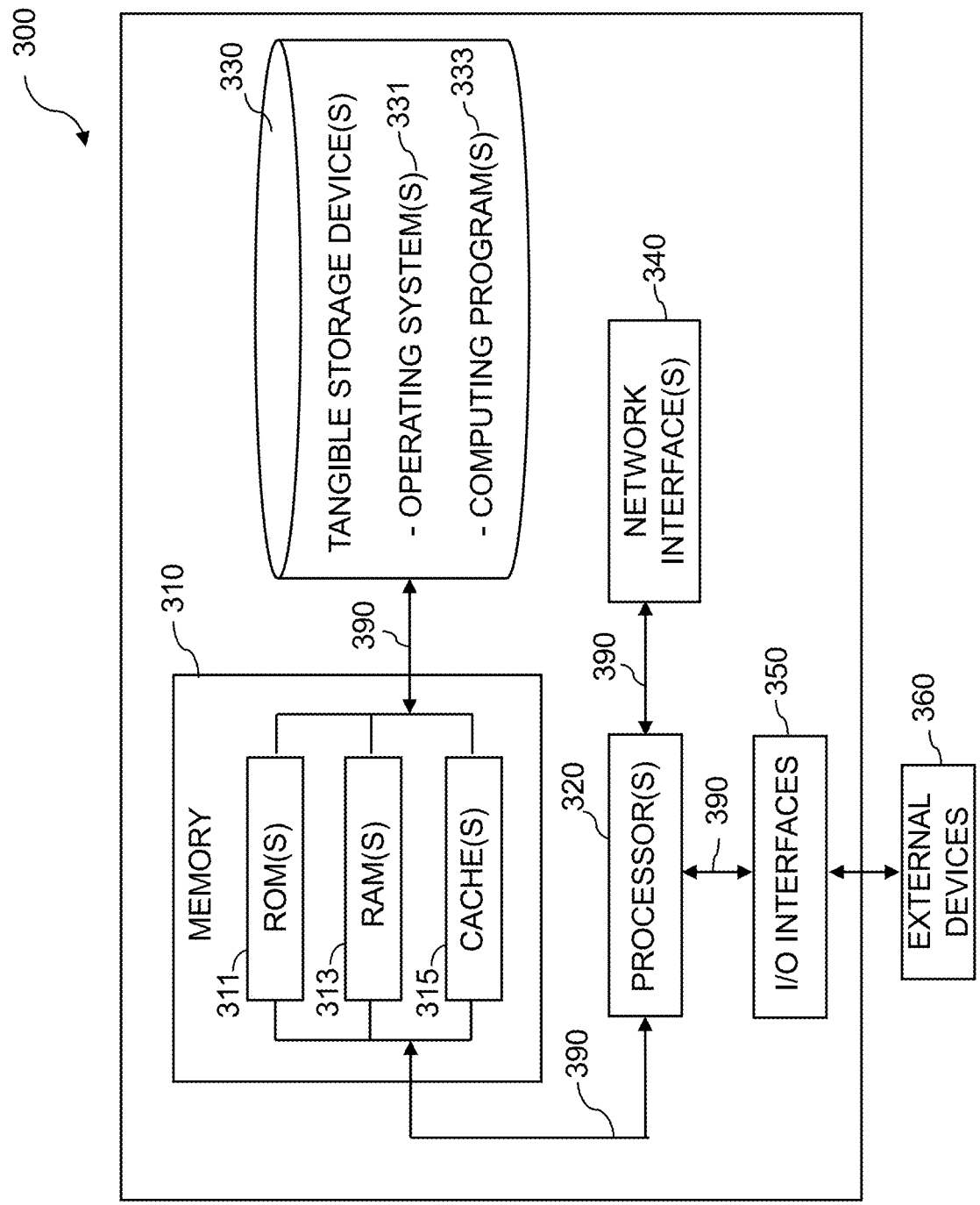
FIG. 3 is a diagram illustrating components of a computing device or server, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations with regard to the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
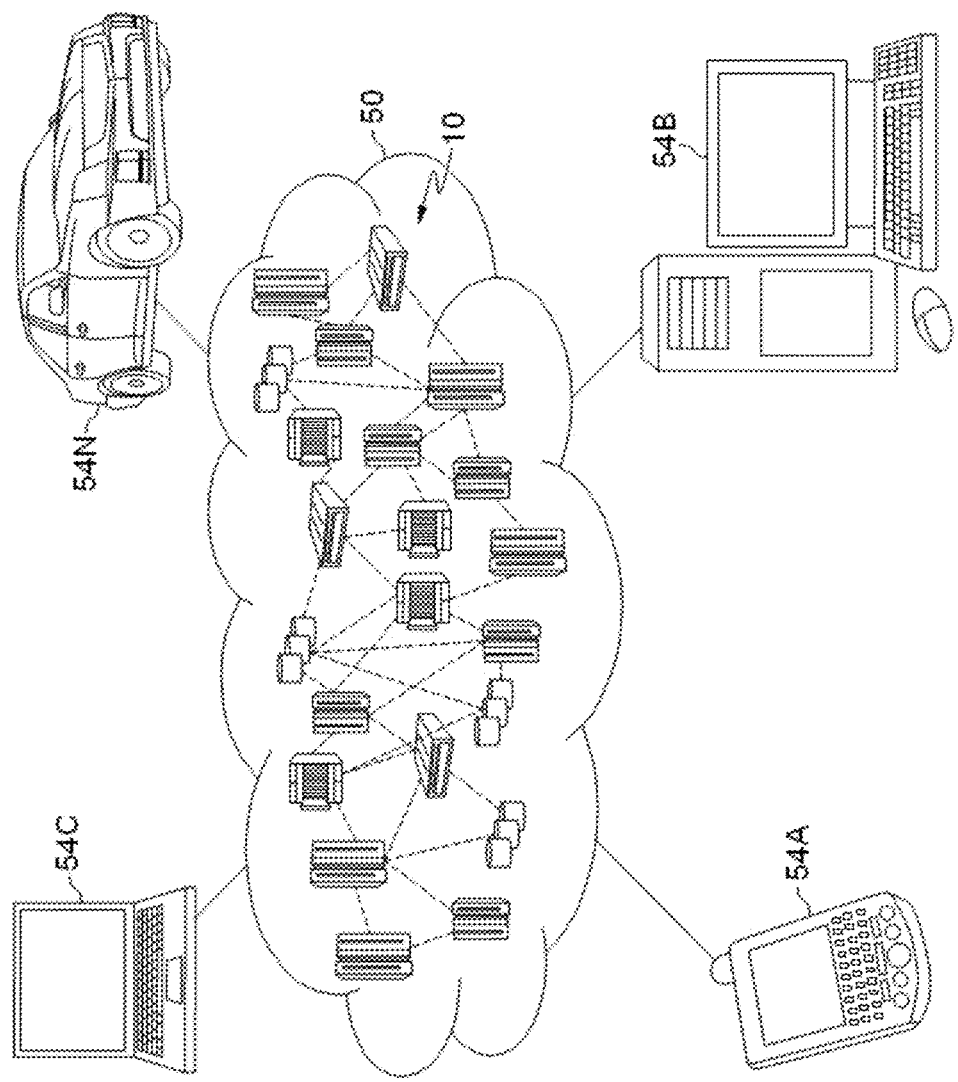
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
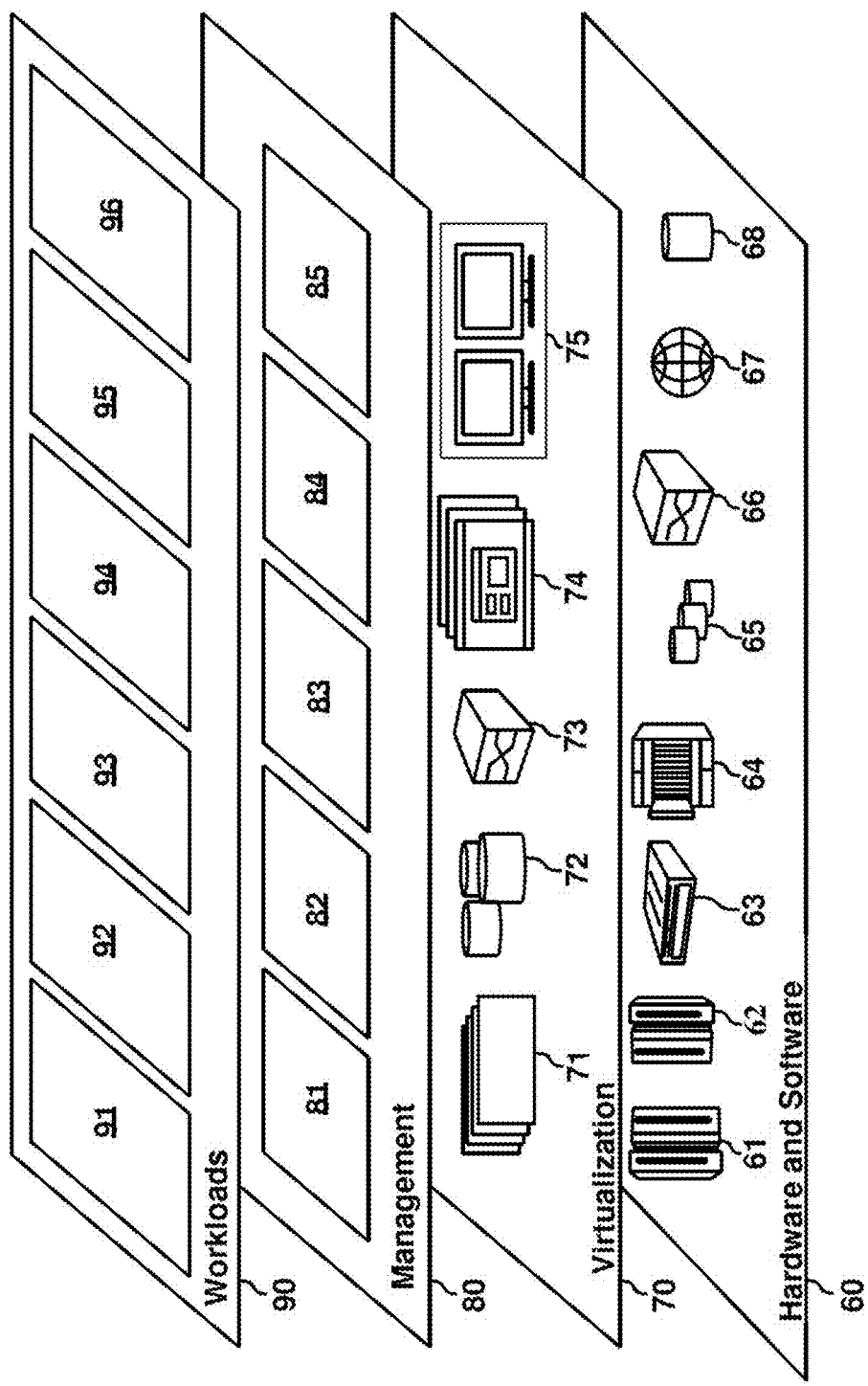
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of dynamically creating a composition reference video to support a user activity.

What is claimed is:

1. A computer-implemented method for dynamically creating a composition reference video to support a user activity, the method comprising:

in response to that a user selects a reference video for performing an activity, identifying a search query of the reference video;

identifying personalized parameters of the user, based on a knowledge corpus about the user, user preferences of performing activities, and the search query;

predicting how the user is to perform the activity, based on the personalized parameters;

identifying appropriate videos and video transcripts in an online video repository, based on a prediction about how the user is to perform the activity;

identifying textual contents through document and text search, based on the prediction;

drawing series of images based on the textual contents;

normalizing contents from the appropriate videos and the series of images;

normalizing voices in the contents from the appropriate videos; and dynamically creating the composition reference video including normalized video contents and normalized voices.

2. The computer-implemented method of claim 1, further comprising:

obtaining information about behaviors and personal choices of the user while performing the activities;

obtaining feeds of Internet of Things (IoT) devices where the user performs the activities; and obtaining feeds of wearable devices with which the user performs the activities.

3. The computer-implemented method of claim 2, further comprising:

creating the knowledge corpus, based on the information about the user, the feeds of the IoT devices, and the feeds of the wearable devices.

4. The computer-implemented method of claim 3, further comprising:

identifying the user preferences of performing the activities, based on obtained data in the knowledge corpus.

5. The computer-implemented method of claim 1, further comprising:

tracking the user while performing the activity;

obtaining information of performing the activity; and updating the knowledge corpus, based on the information of performing the activity.

6. The computer-implemented method of claim 1, further comprising:

in response to determining that multiple users perform the activity and the activity includes multiple collaborative activities, splitting the composition reference video into multiple composition reference videos for respective ones of the multiple users; and customizing the multiple composition reference videos, based on respective ones of the multiple collaborative activities of the multiple users.

7. A computer program product for dynamically creating a composition reference video to support a user activity, the computer program product comprising a computer readable storage medium having program instructions embodied therewith, the program instructions executable by one or more processors, the program instructions executable to:

in response to that a user selects a reference video for performing an activity, identify a search query of the reference video;

identify personalized parameters of the user, based on a knowledge corpus about the user, user preferences of performing activities, and the search query;

predict how the user is to perform the activity, based on the personalized parameters;

identify appropriate videos and video transcripts in an online video repository, based on a prediction about how the user is to perform the activity;

identify textual contents through document and text search, based on the prediction;

draw series of images based on the textual contents;

normalize contents from the appropriate videos and the series of images;

normalize voices in the contents from the appropriate videos; and dynamically create the composition reference video including normalized video contents and normalized voices.

8. The computer program product of claim 7, further comprising the program instructions executable to:
obtain information about behaviors and personal choices of the user while performing the activities;
obtain feeds of Internet of Things (IoT) devices where the user performs the activities; and
obtain feeds of wearable devices with which the user performs the activities.

9. The computer program product of claim 8, further comprising the program instructions executable to:
create the knowledge corpus, based on the information about the user, the feeds of the IoT devices, and the feeds of the wearable devices.

10. The computer program product of claim 9, further comprising the program instructions executable to:
identify the user preferences of performing the activities, based on obtained data in the knowledge corpus.

11. The computer program product of claim 7, further comprising the program instructions executable to:
track the user while performing the activity;
obtain information of performing the activity; and
update the knowledge corpus, based on the information of performing the activity.

12. The computer program product of claim 7, further comprising the program instructions executable to:
in response to determining that multiple users perform the activity and the activity includes multiple collaborative activities, split the composition reference video into multiple composition reference videos for respective ones of the multiple users; and
customize the multiple composition reference videos, based on respective ones of the multiple collaborative activities of the multiple users.

13. A computer system for dynamically creating a composition reference video to support a user activity, the computer system comprising one or more processors, one or more computer readable tangible storage devices, and program instructions stored on at least one of the one or more computer readable tangible storage devices for execution by at least one of the one or more processors, the program instructions executable to:
in response to that a user selects a reference video for performing an activity, identify a search query of the reference video;
identify personalized parameters of the user, based on a knowledge corpus about the user, user preferences of performing activities, and the search query;
predict how the user is to perform the activity, based on the personalized parameters;
identify appropriate videos and video transcripts in an online video repository, based on a prediction about how the user is to perform the activity;
identify textual contents through document and text search, based on the prediction;
draw series of images based on the textual contents;
normalize contents from the appropriate videos and the series of images;
normalize voices in a contents from the appropriate videos; and
dynamically create the composition reference video including normalized video contents and normalized voices.

14. The computer system of claim 13, further comprising the program instructions executable to:
obtain information about behaviors and personal choices of the user while performing the activities;
obtain feeds of Internet of Things (IoT) devices where the user performs the activities; and
obtain feeds of wearable devices with which the user performs the activities.

15. The computer system of claim 14, further comprising the program instructions executable to:
create the knowledge corpus, based on the information about the user, the feeds of the IoT devices, and the feeds of the wearable devices.

16. The computer system of claim 15, further comprising the program instructions executable to:
identify the user preferences of performing the activities, based on obtained data in the knowledge corpus.

17. The computer system of claim 13, further comprising the program instructions executable to:
track the user while performing the activity;
obtain information of performing the activity; and
update the knowledge corpus, based on the information of performing the activity.

18. The computer system of claim 13, further comprising the program instructions executable to:
in response to determining that multiple users perform the activity and the activity includes multiple collaborative activities, split the composition reference video into multiple composition reference videos for respective ones of the multiple users; and
customize the multiple composition reference videos, based on respective ones of the multiple collaborative activities of the multiple users.

* * * * *